A. BALLENBERG.
CASTER.
APPLICATION FILED SEPT. 21, 1909.
1,075,536. Patented Oct. 14, 1913.
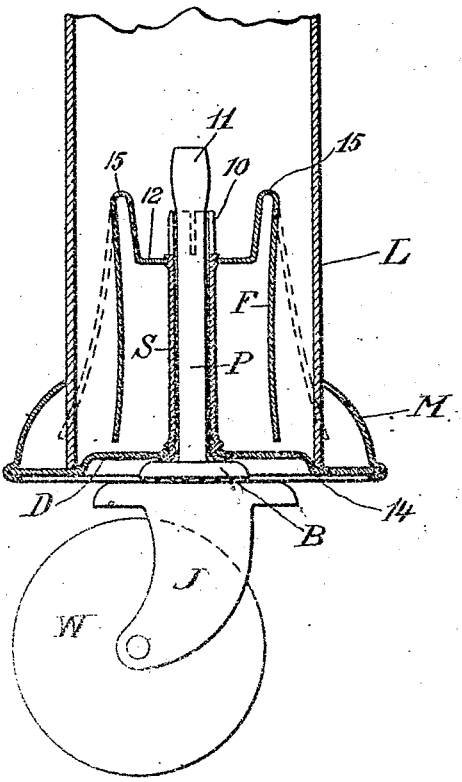
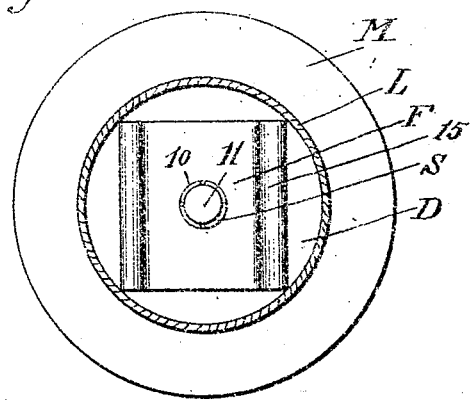
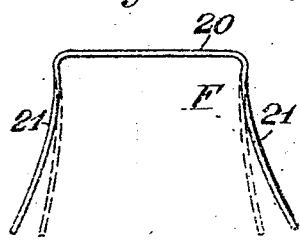
Witnesses
E. P. La Fay
A. Oxham
Inventor
Adolph Ballenberg
By his Attorneys
Dunsey, Mastick & Ogden

UNITED STATES PATENT OFFICE.

ADOLPH BALLENBERG, OF NEW YORK, N. Y., ASSIGNOR TO UNIVERSAL CASTER & FOUNDRY COMPANY, OF NEW YORK, N. Y., A CORPORATION OF NEW JERSEY.

CASTER.

1,075,536.

Specification of Letters Patent.   Patented Oct. 14, 1913.

Application filed September 21, 1909. Serial No. 518,821.

*To all whom it may concern:*

Be it known that I, ADOLPH BALLENBERG, a citizen of the United States, and a resident of the borough of Manhattan, city, county, and State of New York, have invented certain new and useful Improvements in Casters, of which the following is a specification, accompanied by drawings.

The invention is designed for use with tubular legs which are of large diameter relatively to the pintle. It is customary to provide such legs with an ornamental collar or leg mount, and the object of the invention is to provide a simple, economical and reliable caster construction wherein the leg mount is combined with a pintle socket or sleeve and detachably secured therewith to the leg, the pintle and caster proper being preferably detachably secured to the said sleeve or socket.

The preferred embodiment of the invention is exemplified and illustrated in the accompanying drawings, wherein—

Figure 1 is an elevation partly in central section, showing a caster construction embodying the improvement; Fig. 2 is a plan view of the same; Fig. 3 shows a modification of the spring member F of Fig. 1.

In Figs. 1 and 2 W is the caster wheel, J the jaws, B the ball bearing device which may or may not be used, and P the pintle provided with a head 11 for holding it in its socket or sleeve. S is the socket or sleeve which affords bearing and support for the pintle P. Its upper end may be slitted to form spring fingers 10 which allow the head 11 of the pintle to be thrust through them, but normally hold the pintle from dropping out of the socket when the leg is raised. The socket or sleeve S is rigidly secured to the leg supporting disk D and the leg mount M which surrounds and approximately fits and centers the tubular leg L is also rigidly secured to the disk D. Preferably the disk is corrugated to form a shoulder at 14 tending to center the leg internally and prevent tilting of the disk and leg mount. Surrounding the sleeve or socket S and secured to it in any suitable way, as for example by upsetting the metal of the sleeve above and below it, as illustrated, is a spring member F. This spring member F preferably consists of a strip of sheet metal bent, as shown, in Fig. 1, to form a rectangular horizontal portion 12, from which the metal is bent upward and then bent down, as at 15 to form dependent spring wings which press strongly outward against the interior of the leg and secure the combined socket disk and leg mount S, D, M, to the tubular leg. The upper portions of the spring member F will bear against the inner surface of the leg and give support to the upper end of the sleeve S and pintle P when the pintle is tilted slightly, and this feature may be relied upon to center the upper end of the pintle where the shoulder 14 and the construction of the leg supporting disk D is not such as effectively to prevent the relative tilting of the leg L and the combined leg mount and disk.

In Fig. 3 a modified form of the spring member F is shown, in which the upper horizontal portion 20 is of size sufficient to approximately fit the tubular leg and the spring wings 21 are bent downward directly from the flat portion 20. The form shown in Fig. 1 affords greater spring to the spring wings of the member F than Fig. 3, but on the other hand the form shown in Fig. 3 is less liable to be injured and strained against the inner surface of the tubular leg, because the horizontal flat portion 20 is disposed to directly support the horizontally applied force.

It will be seen from the dotted position of the spring wings shown in Fig. 1 that the free ends of the spring extend well down within the leg mount M and are protected thereby when the caster socket and connected parts are shipped or handled while separated from the legs.

In using the improved caster, it will be understood that the combined leg mount, disk and socket S with its spring member F can be applied to the leg and it will be held thereto, and the caster wheel, jaws and pintle can be readily adjusted thereto and detached therefrom.

I claim and desire to obtain by Letters Patent the following:

1. In combination with a caster wheel, jaws and pintle, a pintle supporting sleeve, a leg supporting disk and a leg mount secured to said sleeve, said leg mount extending upward and adapted to surround a tubular leg above the end thereof, and a spring member surrounding the sleeve horizontally and secured near the upper end of the said sleeve and having depending spring wings adapted to act outward against the interior of the tubular leg and extending down within the leg mount, the free ends being surrounded and protected by the leg mount when out of the leg.

2. In a caster for tubular legs and in combination with a caster wheel, jaws and pintle, a leg support and leg mount centered upon the pintle and a spring pintle-retaining and centering member surrounding and centering the upper end of the pintle and having downwardly-extending and outwardly-acting free spring arms, the lower ends of which extend within and are encircled by the leg mount.

In testimony whereof I have signed this specification in the presence of two subscribing witnesses, this 20th day of September, 1909.

ADOLPH BALLENBERG.

Witnesses:
E. P. La Gay,
K. G. Le Ard.